UNITED STATES PATENT OFFICE.

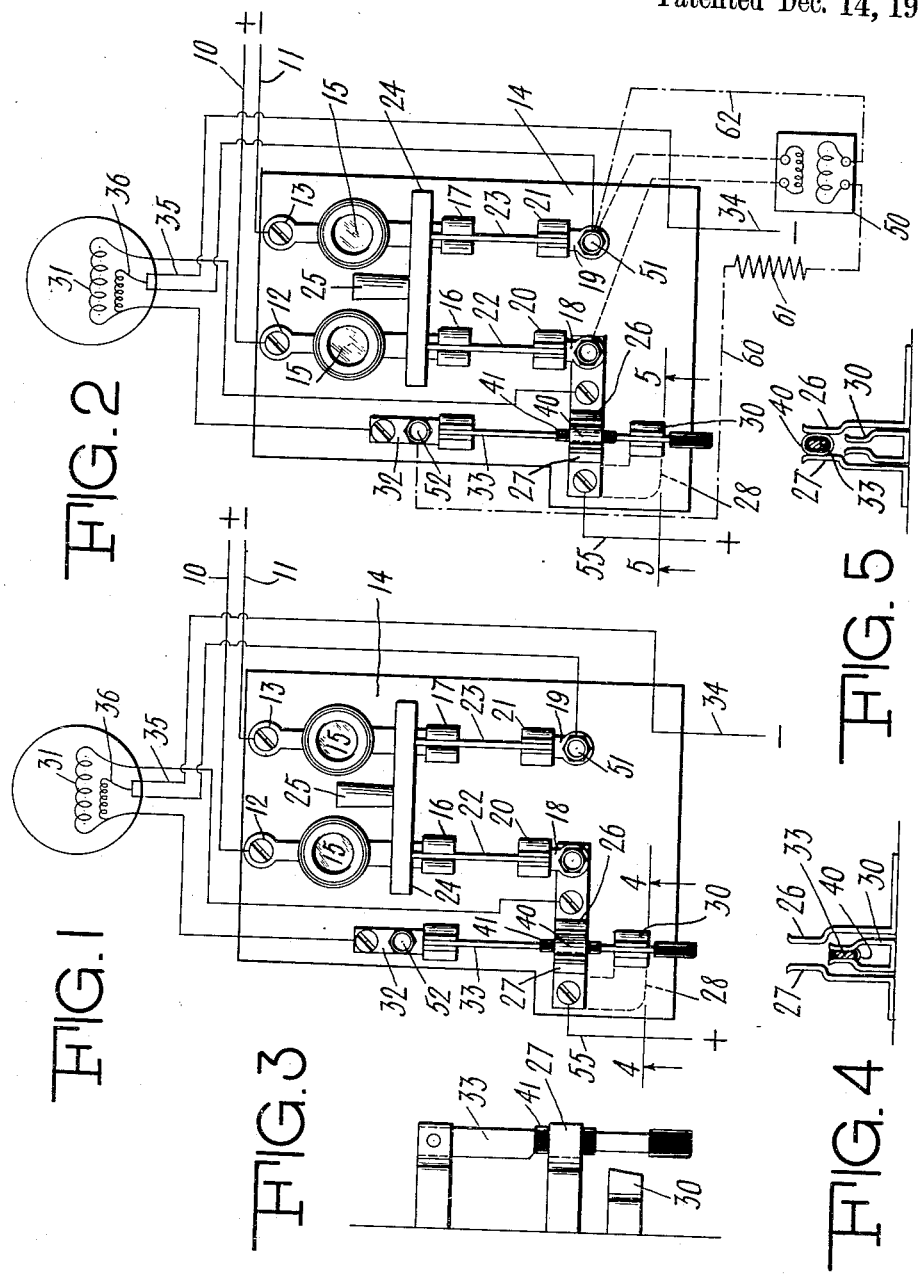

ALBERT P. BALL, OF ROYAL OAK, AND FREDRICK ZENKER, OF HIGHLAND PARK, MICHIGAN, ASSIGNORS TO SQUARE D. COMPANY, OF DETROIT, MICHIGAN, A CORPORATION OF MICHIGAN.

METER-TEST DEVICE.

1,361,955.     Specification of Letters Patent.     Patented Dec. 14, 1920.

Application filed July 17, 1917, Serial No. 180,982. Renewed April 24, 1920. Serial No. 376,433.

*To all whom it may concern:*

Be it known that we, ALBERT P. BALL, a citizen of the United States, residing at Royal Oak, in the county of Oakland and State of Michigan, and FREDRICK ZENKER, a subject of the Emperor of Germany, residing at Highland Park, county of Wayne and State of Michigan, have invented certain new and useful Improvements in Meter-Test Devices, of which the following, taken in connection with the accompanying drawings, is a full, clear, and concise description thereof.

This invention relates to meter testing appurtenances and with regard to certain more specific features thereof to switching devices for varying circuit conditions.

One of the objects of the invention is to provide a simple, durable and inexpensive device of the character above mentioned, adapted to be quickly and conveniently manipulated by the operator to bring about desired circuit conditions.

Another object of the invention is to provide improved means whereby a meter may be arranged in or out of a load circuit without interrupting the supply of current to the load.

Other objects will be in part obvious and in part pointed out hereinafter.

The invention accordingly consists of the various features of construction, combination of elements and arrangements of parts which will be exemplified by the construction hereinafter set forth and the scope of the application of which will be indicated in the following claims.

In the accompanying drawings wherein is shown one of various possible embodiments of the invention:

Figure 1 represents schematically a main switch and meter with related circuits and including the invention in what is styled its service condition.

Fig. 2 is a view similar to Fig. 1 with the circuits in "meter testing condition."

Fig. 3 is a view of the auxiliary switch in meter testing position.

Fig. 4 is a section of the switch and related contacts taken on the line 4—4 of Fig. 1; and Fig. 5 is a sectional view of the switch taken on the line 5—5 of Fig. 2.

Referring now more particularly to the drawing and to Fig. 1 thereof, the main service wires are indicated at 10 and 11 having their respective terminals at 12 and 13. A main switch block is indicated at 14 upon which are mounted the terminals before mentioned, the latter being connected through fuse plugs 15 to the clip terminals 16 and 17. The load circuit terminals 18 and 19 are also mounted upon the block 14 and are provided with clips 20 and 21, respectively, within which are pivotally mounted the connector blades 22 and 23. These blades are connected at their outer ends by the usual insulating bar or head 24 which in turn is provided with an operating handle 25. Extending laterally from the load circuit end terminal 18 is a clip 26 and spaced apart therefrom is a second clip 27 having electrical communication through a connector strip 28 with a knife-blade-receiving clip contact 30. The clip 26 serves to provide a terminal for one side of a meter circuit which for the purpose of this case may be regarded as incidental to the load circuit. This meter circuit includes a current coil 31 connected at one end to the clip 26, as described, and having its opposite end connected with a contact member 32, the latter being shaped at one end to provide a pair of lips between which a movable knife blade connector 33 is pivoted.

Under service conditions, as shown in Figs. 1 and 4, current entering from the positive service wire proceeding through the positive side fuse 15, connector 22, series coil 31, contact member 32, knife blade connector 33, which is then out of bridging engagement with clips 26 and 27 but in engagement with clip contact 30 through said contact and the connector strip 28 to the positive load wire, through the load to the negative load wire 34, through the loop 35 of said wire which provides for connection of a potential coil 36 of the meter, thence through the negative connector 23 of the main switch negative fuse to negative service wire 11. It will, therefore, be seen that an electrical circuit is completed from the main service wires to the load through and including the meter.

The occasion often arising for a test of meters of this character and it being desirable in effecting such test that the changing of wires and connections be reduced to a minimum and the customer's service be uninterrupted, the present invention is designed to effect the necessary changes in the system to permit a test meter to be included in a test circuit by simple and inexpensive means and by a slight switching movement.

Referring now more particularly to Figs. 2, 3 and 5 it will be noted that the knife blade connector 33 is shifted from a position in engagement with the contact 30 to a position where a metal sleeve 40 surrounding the knife blade connector 33 but insulated therefrom by a hard rubber bushing 41 bridges the two clips 26 and 27 establishing an electrical connection from the load terminal 18 to the load direct, by-passing the meter coil and its circuit. Attention is directed to the fact that the parts of the switch are so proportioned and arranged that before the knife blade connector disengages from the lips of contact 30, the bridging action has taken place between the contacts 26 and 27 by reason of the metal sleeve 40 having engaged therewith. This insures continuity of service to the load.

The system having been placed in condition for test by the switching operation just described, a test meter 50 may be introduced by plugging the cords of its series coil into sockets 51 and 52 provided in electrical communication with negative load terminal 19 and contact 32, respectively. The potential coil of the test meter is connected across the load terminals 18 and 19. The series coils of both meters are thus included in series arrangement in a circuit across the load circuit in advance of the load, the load circuit being from the positive service wire through the positive fuse, positive blade of a knife blade switch, load terminal 18, clip 26, bridging sleeve 40 of the knife blade connector 33, clip 27 to positive load wire 55 through the load, negative load wire 34, through the negative loop 35 to negative load terminal 19, thence, as will be obvious, to the negative service wire. The meter test circuit is from the positive load terminal 18 through clip 26, house meter coil 31, connector 32, socket 52, positive test meter cord 60, test load 61, series coil of the test meter to negative test cord 62, thence to the negative load terminal.

Attention is directed to a co-pending application, Serial No. 175,752, filed June 20, 1917, this invention being in the nature of an improvement over or for use in connection with the invention therein shown.

As many changes could be made in the above construction and as many apparently widely different embodiments of the invention could be made without departing from the scope thereof, it is intended that all matter set forth in the foregoing description or shown in the accompanying drawings shall be interpreted as illustrative and not in a limiting sense.

What is claimed is:

1. In service and meter-test apparatus, in combination, a circuit including a house meter, a contact in said circuit, a single pole single throw switch blade pivotally mounted relatively too said contact, a second contact connectible to the first contact by said switch blade when in one position, and a pair of relatively spaced contacts, said switch having a bridging member mounted thereon but insulated therefrom, said relatively spaced contacts and bridging member coöperating together when the switch blade is in a position to disconnect the first and second contacts.

2. A device as in claim 1, wherein one of the relatively spaced contacts and the second contact are electrically connected, and the bridging member connects the contacts before the switch blade is disconnected from the second contact.

3. In service and meter-test apparatus, a circuit including a house meter and a pivotally mounted switch, a pair of contacts spaced longitudinally of said switch, a pair of contacts spaced transversely of said switch, and a bridging element on said switch insulated from the main body thereof, said longitudinally spaced contacts being connectible by the main body of said switch in one position to include the house meter in said circuit for normal service operation, and said switch being movable to bridge the transversely spaced contacts to condition the apparatus for a meter test.

4. In service and meter-test apparatus, a circuit including a house meter and a pivotally mounted switch, a pair of contacts spaced longitudinally of said switch, a pair of contacts spaced transversely of said switch, and a bridging element on said switch insulated from the main body thereof, said longitudinally spaced contacts being connectible by the main body of said switch in one position to include the house meter in said circuit for normal service operation, and said switch being movable to bridge the transversely spaced contacts to condition the apparatus for a meter test, there being no point in said switching movement where both pairs of contacts are simultaneously open.

5. In service and meter-test apparatus, a main switch for connecting a source of current supply with a load, a meter adapted to measure the current consumed by the load, electric circuits and a circuit controlling device comprising a pivotally mounted knife blade switch, a bridging member thereon insulated from the knife blade, a pair of longitudinally spaced clip contacts connectible by said knife blade to establish a normal service condition of said circuits, and a pair of transversely spaced contacts toward which said switch is movable to establish a meter test condition of said circuits by engaging said bridging member with said transversely spaced contacts and disconnecting the first said pair of contacts.

6. In service and meter-test apparatus, in combination, a pair of fixed longitudinally spaced contacts, one contact of each pair being in permanent electrical communication with the meter, and a pivotally mounted switch having a longitudinal bridging element and a transverse bridging element relatively insulated, said switch being adapted for movement from a position where the longitudinal element bridges the longitudinally spaced contacts to establish normal service conditions to a position where the last said contacts are disconnected and the transversely spaced contacts are bridged to establish a meter test condition of the apparatus.

7. In service and meter-test apparatus, in combination, a pair of fixed longitudinally spaced contacts, one contact of each pair being in permanent electrical communication with the meter, and a pivotally mounted switch having a longitudinal bridging element and a transverse bridging element relatively insulated, said switch being adapted for movement from a position where the longitudinal element bridges the longitudinally spaced contacts to establish normal service conditions to a position where the last said contacts are disconnected and the transversely spaced contacts are bridged to establish a meter test condition of the apparatus, the contacts and switch being so arranged that both pairs of contacts are not simultaneously opened during said switch movement.

8. In service and meter-test apparatus, in combination, a pair of fixed longitudinally spaced contacts, a knife blade switch pivotally mounted on one contact of said pair and movable into and out of engagement with the other contact of said pair, a pair of fixed transversely spaced contacts, a metal sleeve around said knife blade and insulated therefrom adapted to be moved into bridging relation with said transversely spaced contacts as said switch is moved out of engagement with said contact of said first pair.

ALBERT P. BALL.
FREDRICK ZENKER.